Figure 1:
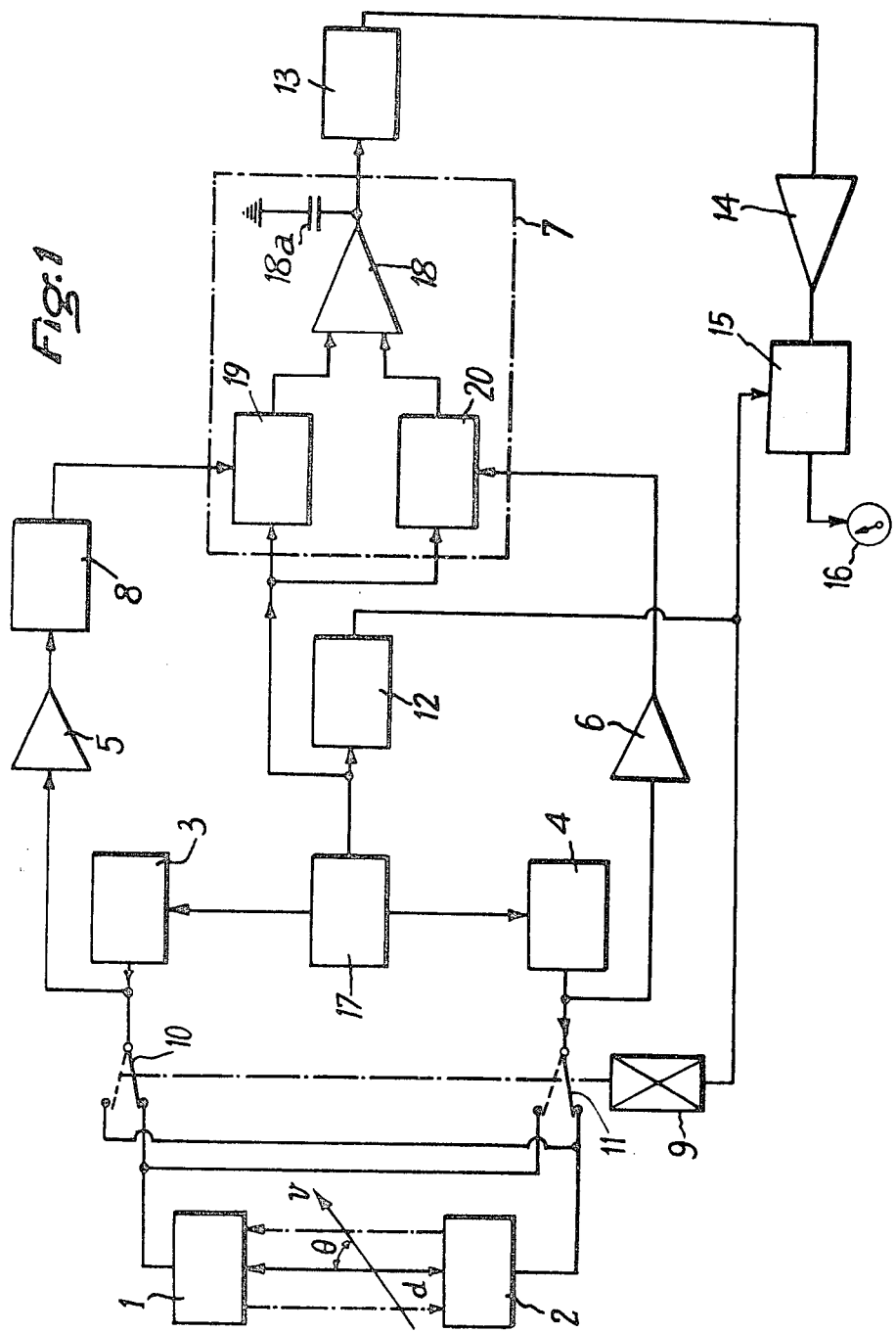

United States Patent
Dory

[15] 3,641,817
[45] Feb. 15, 1972

[54] ULTRASONIC FLOWMETER

[72] Inventor: Jacques Dory, Meaux, France

[73] Assignee: Realisations Ultrasoniques, Meaux (Seine-&-Marne) Chaussee de Paris, France

[22] Filed: Feb. 14, 1969

[21] Appl. No.: 799,212

[30] Foreign Application Priority Data

June 19, 1968 France...................................155534
Feb. 26, 1968 France...................................141181

[52] U.S. Cl. .............................................73/194 A, 324/83
[51] Int. Cl. .........................................................G01k 7/00
[58] Field of Search .............................324/83; 73/194 A, 32

[56] References Cited

UNITED STATES PATENTS

| | | | |
|---|---|---|---|
| 3,050,997 | 8/1962 | Lake | 73/194 |
| 3,329,017 | 7/1967 | Yamamoto | 73/194 |
| 3,021,481 | 2/1962 | Kalmus et al. | 324/83 |
| 3,209,591 | 10/1965 | Lester et al. | 73/181 |
| 3,336,801 | 8/1967 | Snavely | 73/189 |
| 3,440,876 | 4/1969 | Hayes et al. | 73/194 |

FOREIGN PATENTS OR APPLICATIONS

| | | | |
|---|---|---|---|
| 191,155 | 3/1967 | U.S.S.R. | 73/194 |
| 1,375,940 | 11/1967 | France | 73/194 |
| 146,517 | 8/1961 | U.S.S.R. | |

Primary Examiner—Richard C. Queisser
Assistant Examiner—John Whalen
Attorney—William Anthony Drucker

[57] ABSTRACT

The invention relates to ultrasonic fluid flowmeters of the type comprising a pair of transducers acting both as a transmitter and receiver, and circuit means for measuring the time shift between the ultrasonic signals respectively received by the two transducers after propagation in the fluid. According to an important feature, switching means are provided whereby the connection between the two transducers and the receiving and measuring circuits is periodically reversed, which eliminates errors due to variations in the conditions of propagation.

8 Claims, 5 Drawing Figures

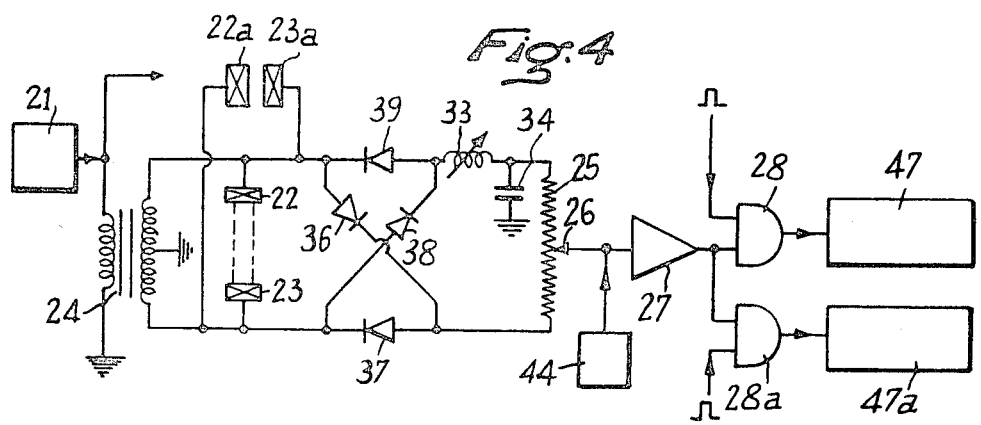
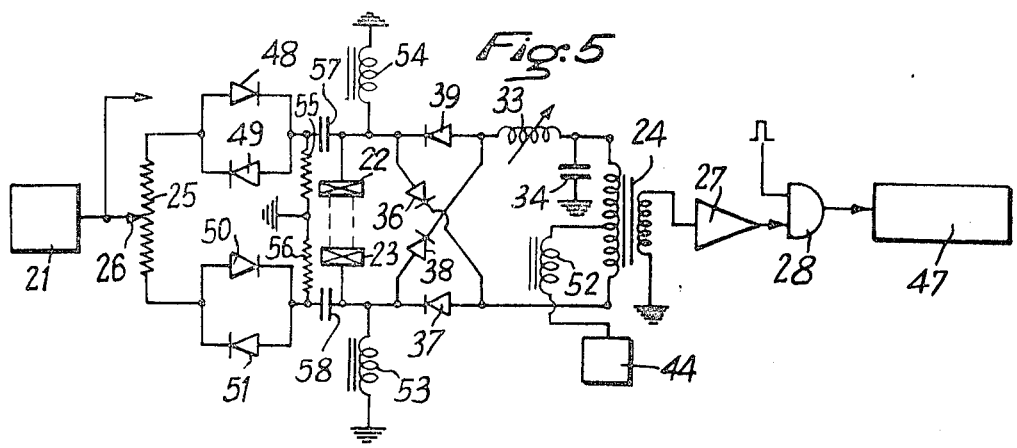

ULTRASONIC FLOWMETER

The present invention relates to the acoustic measurement of the flow of a fluid, according to the known method which consists in immersing acoustic probes in this fluid and in measuring the propagation times of pulses between transmitter probes and receiver probes.

Two pairs of probes are generally used, each pair comprising a transmitter probe and a receiver probe, this presenting the disadvantage of requiring a very accurate positioning of the probes, if it is desired to obtain a relatively accurate measurement.

It has already been proposed to use a single pair of probes, each of which acts both as a transmitter and receiver. The transmission of the pulse by the two probes is then synchronized, while the reception of the pulse is shifted by an interval of time proportional to the velocity of the fluid. It has been proposed to measure this interval of time by triggering a clock pulse counter at the moment of reception of the first pulse and by stopping the counting at the moment when the second pulse is received. It is obvious that, whatever device is used for measuring this interval of time, this measurement is vitiated by a certain error which is due to the fact that the pulses transmitted by the two reception channels do not have a perfectly rectangular waveform, so that the instant when their leading edge reaches a predetermined level is not perfectly defined.

When it is a question of estimating very low velocities for example of the order of 1 centimeter or even 1 millimeter per second, the above-mentioned interval of time may be of the order of a nanosecond, so that its measurement becomes very difficult.

Instead of each of the transmitted pulses being constituted of a single short oscillation and instead of the shift between the leading edges of the corresponding echoes received being measured, it is obviously possible to constitute each of these pulses of a train of oscillations and to effect a measurement of the phase shift between the corresponding signals received. It is, in fact, question of a simple variant embodiment of the same method of measuring the time shift between the pulses transmitted and the pulses received.

This variant embodiment is obviously applicable only to relatively low flow velocities, which do not bring about a phase shift greater than 180°, but it presents the advantage of using a particularly simple equipment.

However, as in the first embodiment mentioned above, according to which the time shift is measured by counting clock pulses, it is affected by certain causes of errors, due in particular to the variations of the power of the ultrasonic generator or of the conditions of propagation, and does not enable the direction of flow to be ascertained.

The present invention has for its object an improved apparatus for carrying out the above-mentioned method of flowmetering in which the causes of errors and certain of the above-mentioned limitations have been eliminated.

The apparatus according to the invention comprises at least one pair of transmitter-receiver transducers having their active surfaces parallel and opposite one another, means for bringing about the simultaneous transmission of a short acoustic signal by each transducer, means for receiving the short acoustic signals respectively picked up by the two transducers after propagation within the fluid, whose flow velocity it is desired to measure, and means for measuring the time shift between the acoustic signals thus picked up, and is mainly characterized by means for periodically reversing the connection between the two transducers and the receiving or measuring means.

Figure 2:
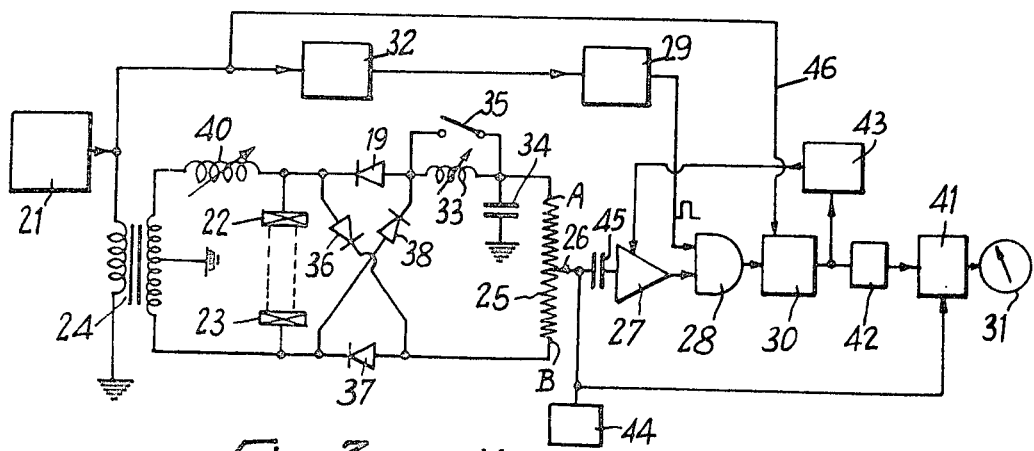
Figure 3:
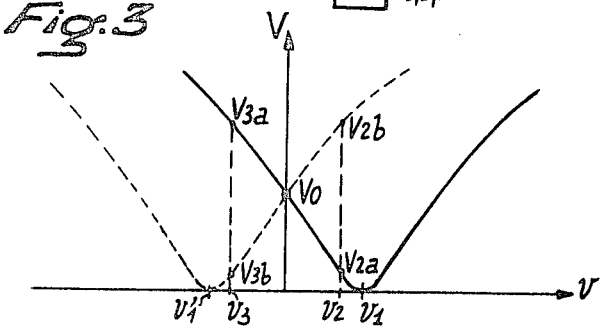

The various characteristics as well as the advantages of the invention will clearly appear with the aid of the following description. In the accompanying drawings:

FIG. 1 is a general diagram of a flow-meter according to a first embodiment of the invention;

FIG. 2 schematically shows a second embodiment thereof;

FIG. 3 is a diagram serving to illustrate the operation of the apparatus of FIG. 2 and FIGS. 4 and 5 show variant embodiments of the apparatus of FIG. 2.

Referring to the drawings, FIG. 1 shows two transducers 1 and 2 having their active faces parallel and opposite, at a distance $d$ from one another, the direction of propagation of the ultra sounds between these two transducers forming an angle with the direction of the flow velocity $v$ of the fluid in which they are immersed.

The transducers 1 and 2 are respectively fed by two recurrent electric pulse generators 3 and 4, synchronized by a common clock 17.

By suitably producing and arranging the transducers and the generators, the acoustic pulses which they transmit are each constituted of a single oscillation, of short duration, of the high-frequency wave produced by the oscillator which each of the generators comprises. Here it is a question of well-known equipment which is useless to describe in detail.

The pulses respectively picked up by the opposite faces of the transducers 2 and 1 are received by two amplifiers 5 and 6, and their moments of reception $t_1$ and $t_2$, shifted with respect to one another, are compared by means of a measuring circuit 7.

It is easy to show that the shift $t_1-t_2$ is substantially proportional to $v \cos \theta$.

In fact, the device 7 measures, when the assembly is connected as indicated in solid lines in FIG. 1, a value $$M_1 = t_2 - t_1 + \tau + \Delta t_2 - \Delta t_1$$

$\tau$ designating the systematic delay (which moreover is not strictly indispensable) introduced by a delay member 8, whose function will be explained in the following, and $\Delta t_1$ and $\Delta t_2$, the errors which affect the moments of triggering of the device 7 by the pulses received at 3 the outputs of units 8 and 9, taking into account the imperfections in shape of said pulses, and the delays introduced by the circuits of the receivers 5 and 6.

According to an essential feature of the device described, a switch 9 enables the connecting terminals 10 and 11 to be brought into the positions shown in dotted lines, this having for its effect to transmit the pulse issuing from the transducer 2 to the receiver 5 and the pulse issuing from the transducer 1 to the receiver 6. In this position of the switch, a measure $M_2 = t_1 - t_2 + \tau + \Delta t_2 - \Delta t_1$ is obtained.

It may be seen that $M_1 - M_2 = 2(t_2 - t_1 - \tau)$.

As the delay $\tau$ has a known value, it is possible to deduce therefrom, without any error, the interval $t_2 - t_1$.

Of course, the preceding reasoning is correct only is the propagation times of the ultrasounds between the transducers have not varied from measurement $M_1$ to measurement $M_2$: to this end, it is sufficient that the switching be sufficiently rapid. This result is in practice obtained by using for example a pulse recurrence frequency (determined by the clock 17) equal to 1 kMz. (value given by way of nonlimiting example) and by effecting a switching every two pulses. To this end, the switch 9 is controlled by pulses issuing from a bistable unit 12 fed by the clock 17.

The switch 9 is advantageously constituted of an electromechanical relay, which presents the particular feature of possessing a substantially zero electrical resistance. In this case, the recurrence frequency must be relatively low, about 100 Hz., in order to take into account the inertia of the relay.

Other types of switches may be used, on the condition that their electrical resistance is low.

The introduction of a notable resistance to the switching would, in fact, have the disadvantage, by modifying the gain of the receivers upon passage from the first to the second measurement, of introducing an error which is not compensated for in the measurement of the time.

It may be observed that the switching, instead of being carried out at the level of the connection between transducers and receivers, could be established at other points in the two receiver channels of the pulses: in this case, it will, however, be noted that the errors introduced by the "upstream" parts of the circuits will not be removed when the difference $M_1 - M_2$ will be made, this being a disadvantage.

The design of the measuring circuit 7 is within the scope of the skilled man. It may comprise for example a differential amplifier 18 fed by two bistable circuits 19 and 20 switched in one of their stable states by the pulse issuing from the clock 17 and returned to their other stable state by the pulses of the two respective receiving channels. This differential amplifier acts at the same time as an integrator and, to this end, a capacitor 18a is connected between its output and earth. It is further arranged for operating as a peak detector. Under these circumstances, it may be shown that the output signal of the amplifier 18 has the form of a square wave having successively an amplitude proportional to $M_1$, then to $M_2$. The peak-to-peak amplitude of said square signal is thus proportional to $M_1-M_2$.

A high-pass filter 13 eliminates the DC component of said square wave, while its AC component, after amplification at 14, is applied to a synchronous demodulator 15 which accurately detects this peak-to-peak amplitude. A measuring apparatus 16, connected to the output of the demodulator, is directly graduated in speed. The synchronous demodulator eliminates the parasitic frequencies which may be introduced in the circuits and, on the other hand, presents the advantage of giving at its output a positive or negative current, according to the sign $M_1-M_2$, thus according to the direction of flow of the fluid. To this end, a reference phase is applied to the synchronous demodulator from the output of the bistable unit 12.

The role of the delay member 8, which can indifferently be inserted in one or the other of the two receiving channels, is to avoid making the differential amplifier operate, under certain circumstances, near a zero output, since this would risk leading to delicate adjustments.

The apparatus of FIG. 2 essentially comprises a pulse generator 21 which excites, in phase opposition, two transducers 22 and 23 immersed in the fluid whose flow it is desired to measure, by means of a transformer 24 whose secondary winding has its center point connected to earth. A potentiometer 25, whose ends are respectively connected to the transducers 22 and 23, has its slide contact 26 connected to the input of an amplifier 27, whose output is connected to the input of an AND-gate 28 having two inputs. The other input of this gate is connected to the output of a square wave generator 29, while its output is connected to a peak detector device 30, itself connected to a flow velocity indicator or recorder 31 which may be of any suitable type, according to the type of indication or even the type of recording which it is proposed to obtain.

The square wave generator 29 is advantageously constituted of a bistable circuit, itself controlled by a monostable multivibrator 32 triggered by the transmitted pulse.

The apparatus of FIG. 2 comprises in addition a switch and a phase shifter.

The phase shifter is for example constituted of an adjustable inductance coil 33 connected in one of the two branches which connect the transducers to the potentiometer 26 and of a capacitor 34 connected between one end of the coil and earth. The coil may be short-circuited by means of a switch 35.

The switch, which has for its function rapidly to reverse the connection between the transducers and the potentiometer, could be of a mechanical type. However, it is preferably constituted of four diodes 36 to 39 arranged in a ring.

An adjustable inductance coil 40 is advanteously connected between the secondary winding of the transformer 24 and one of the transducers.

A synchronous demodulator 41 has its input connected to the output of the peak detector 30 by means of a filter 42, and its output connected to the indicator 31. The output of the detector 30 is moreover connected to a gain control input of the amplifier 27, by means of a filter 43.

A generator 44 controls the switching, while a capacitor 45 decouples the amplifier 7 with respect to the switching signals.

The operation of the apparatus of FIG. 2 is illustrated in FIG. 3, which shows the voltage V on the slide contact 26 as a function of the flow velocity $v$, counted positively in one direction of flow, negatively in the other.

The transducers 22 and 23, excited in phase opposition at the rate of 100 pulses per second for example, transmit into the fluid, for each excitation pulse, a train of damped ultrasonic oscillations of high frequency $f$ (10 MHz. for example). Each train, comprising several tense of damped oscillations, lasts for example 4 microseconds. As the train transmitted by each transducer is picked up by the other, it is obvious that, if the flow velocity is zero, the reception of the two trains produced by a given excitation pulse will be simultaneous, the propagation speed then being the same in the two directions. In this case, the sum of two short high-frequency electric signals (4 microseconds) is picked up on the slide contact 26, exactly in phase opposition with respect one to another, so that, for a suitable adjustment of the position of the slide contact 26, the amplitude of the voltage V applied to the amplifier 7 is strictly zero.

On the other hand, when the flow velocity is not zero, the two trains are received with a time shift $\Delta t$, which is substantially proportional to the component of said velocity according to the direction of propagation of the ultrasounds, said component being that one which the apparatus is intended to measure. This results in a phase shift $\Delta\phi$ of the two signals, and one has: $\Delta\phi=2\pi\phi\Delta t$.

It may be shown that the amplitude V is then an increasing function of $\Delta t$, thus of the velocity to be measured. The peak detector 30 gives a DC signal proportional to this amplitude, so that the indicator 31 may be a simple conventional measuring instrument graduated in flow velocity. It will be noted that the potentiometer 25, the amplifier 27 and the peak detector 30 constitute an analog phasemeter of a type known per se.

The gate 28 serves to eliminate the residual signal which may appear at the output of the amplifier 27, if the two excitation pulses applied to the transducer are not absolutely annulled. These pulses have in fact a much higher amplitude than the signals received (100 v. against 10 or 20 mv. for example) and it is therefore important to eliminate their influence completely. To this end, the monostable multivibrator 32 produces a square wave whose leading edge coincides with the excitation pulse, and of a duration shorter than the propagation time. The bistable circuit 29, normally in the state 1, is placed in state O by this square wave, so that the transmission of the signal issuing from the amplifier 27 through the gate 28 is eliminated for the duration of this square wave. The circuit 33–34 introduces an auxiliary phase shift between the short high-frequency signals respectively issuing from the two transducers, so that the curve taken for a given position of the switch (for example, when the transducer 22 is connected to the terminal A and the transducer 23 to the terminal B of FIG. 2) corresponds to a voltage V which decreases up to a positive value $v_1$ of the flow velocity and which increases beyond this value. This value $v_1$ is that for which the above-mentioned phase shift $\Delta\phi$ is exactly opposite the auxiliary phase shift $\phi$.

The result is that, on condition that the speeds measured do not reach a value higher than $v_1$, the voltage V is always greater than $V_o$ for the negative direction and always lower than $V_o$ for the positive direction of the flow. One could then be content to use the simple phase meter device constituted of the members 25–27 and 30 with an indicator 31 graduated in positive and negative speeds.

It is, however, preferable to switch, at a rate for example equal to the rate of the excitation pulses, the connection of the transducers to the potentiometer. In fact, the static voltage $V_o$ may vary as a function of possible variations in the power output of the generator 21 or of the conditions of propagation of the ultrasounds, this being a cause of error in the measurement. It is specifically the switching which enables this cause of error to be eliminated.

In fact, when the transducer 22 is connected to the terminal B and the transducer 23 to the terminal A, the curve shown in dotted lines in FIG. 3 is obtained, since the phase shifts $\Delta\phi$ and $\Phi$ are then added instead of being subtracted.

The two curves intersect at $V_o$ and are symmetrical with respect to the y-axis.

For a predetermined positive value of $v$, or $v_2$, two amplitudes $V_{2a}$ and $V_{2b}$, (FIG. 3) with $V_{2a} < V_{2b}$, are successively obtained on the slide contact 26. On the contrary, for a negative value $V_3$, $V_{3a} > V_{3b}$. Finally short signals modulated at high frequency are obtained at 26, whose amplitude has an average value close to $V_o$ (at least when $v$ is between $v_1$ and $v'_1$) and whose instantaneous variations are proportional to V, the signals corresponding to values of $v$ symmetrical with respect to the origin of the x-axis being in phase opposition. These short signals follow one another at a rate equal to that of the excitation pulses. Their width is equal to the duration of the oscillation trains, or 4 microseconds in the example in question. The peak detector 30 is of a type, known per se, capable of retaining in memory the peak value of these signals during the interval which separates them. The return to zero, at the end of this interval, is effected by the excitation pulse, transmitted by the connection 46. Thus, at the output of the detector 30, a demodulated square wave voltage is obtained of successive amplitudes $V_{2a}$ and $V_{2b}$ (for $v=v_2$) and, of average value $V_o$. The AC component of this voltage is transmitted to the synchronous demodulator by the filter 42, while its average component, proportional to $V_o$, transmitted by the filter 43, serves to adjust the gain of the amplifier 27 so as to annul the effect of the fluctuations that $V_o$ may undergo, this eliminating the above-mentioned cause of error.

The demodulator 42, of a type known per se, gives a DC voltage proportional to the peak-to-peak amplitude of these square waves, thus as a function of the velocity $v$, so that the measuring instrument 31 may be graduated in flow velocity by a suitable calibration.

The sign of this voltage depends upon the phase of the square waves with respect to the switching signal, applied to the demodulator 41 as phase reference. The instrument 31 thus indicates the direction of the flow.

The operation of the switching device is as follows:

The generator 44 produces a square wave voltage of frequency equal to the frequency of the excitation pulses. When the square waves are positive in value, the diodes 37 and 39 are open, the diodes 36 and 38 then being blocked, while it is the reverse when the square waves are negative in value.

The auxiliary coil 40 serves to compensate for the parasitic phase shift introduced by the transformer 24. The switch 35, normally open, serves, when it is closed, to effect an initial adjustment of the apparatus; this closure causes Φ to be annulled. At this moment, the solid and dotted curves of FIG. 3 merge and $V_{2a}=V_{2b}$. The signal leaving the peak detector therefore no longer presents any AC component at the switching frequency and the output voltage of the synchronous detector is zero, this being so on condition that the correction coil 40 is properly adjusted.

In order to adjust the zero of the apparatus, it is therefore necessary to turn the switch 35 off and to adjust the coil until the voltage supplied by the synchronous detector is annulled.

FIG. 4 shows, in simplified manner, the same apparatus as in FIG. 2: the auxiliary components, such as 29–32–35, have not been shown; the control of the gate 28 (components 29 and 32) have been symbolized by a square wave, while the measuring circuit (components 30, 42, 41, 31) have been symbolized by a block 47. FIG. 4 is intended to show that a second pair of transducers 22a–23a may be connected to the secondary winding of the transformer 24. The voltages V and Va supplied by these two pairs of transducers will be applied to the input of the amplifier 27, then to the gate 28 and 28a in order to be respectively detected and converted into flow velocity indications by two identical measuring circuits 47 and 47a.

In order that the voltages V and Va appear in the form of separate pulse trains, thus usable by the two measuring circuits, it is sufficient that the distances between the transducers 22 and 23 on the one hand, 22a and 23a on the other hand, are slightly different.

In the same way, a third measuring circuit may be provided and a third pair of transducers may be connected to the terminals of the secondary winding of the transformer 4. The apparatus thus permits the different components of a movement of fluid to be measured in several directions, this being advantageous for example for studying swell.

FIG. 5 shows a variant of the apparatus of FIG. 2, in which the positions of the transformer 24 and the potentiometer 25 have been exchanged. Therefore the operation is substantially not modified; however, as the resistance of the potentiometer must be low compared with the impedance of the transducers in order that the excitation pulse is transmitted with a sufficient power to these latter; this low resistance will tend to short circuit the primary winding of the transformer 24. In order to eliminate this disadvantage, a pair of diodes (48–49 and 50–51), mounted head-to-tail, have been arranged in each branch. The diodes are open with respect to the excitation pulses, which have a high level, and thus do not influence their transmission. On the contrary, compared with the weak signals issuing from the transducers, they are blocked, so that, with respect to these signals, the resistance of the potentiometer 25 is not connected.

The assembly of FIG. 5 is completed by choke coils 52 to 54 and by leakage resistors 55 and 56 and capacitors 57 and 58.

It is obvious that various modifications may be made to the circuit arrangements described and shown, without departing from the scope of the invention.

It may be noted that the probes are not necessarily immersed in the liquid. They may be placed on the wall of a pipe. In this case it is sufficient that the ultrasonic beam emitted by a probe traverses the pipe obliquely after having cleared the walls, and reaches the opposite probe mounted in symmetrical manner.

In practice, each probe may be constituted of an acoustic prism which will emit in the wall transverse waves forming with the normal an angle of for example between 50° and 80°. This transverse wave will be refracted on the wall/liquid interface in order to produce a wave whose inclination will depend upon the angle of emergence and upon the ratio between the speeds of the waves in the wall and in the liquid.

Longitudinal waves may also be transmitted in the wall, but in this case, the waves refracted in the liquid form a larger angle with the axis of the pipe and the accuracy is reduced.

I claim:

1. A fluid velocity measuring system including: at least first and second opposed acoustic transducers; generator means cyclically applying short electric signals to the respective transducers to cause each of the said transducers to propagate short acoustic signals through the fluid under measurement toward the opposed transducer which upon receipt of the acoustic signals, provides respective first and second echo pulses; means for measuring the time shift between said first and second echo pulses, said means having first and second inputs; means connecting the said transducers to the said inputs, said connecting means including switching means connected to the said transducers and means for cyclically controlling the said switching means, whereby the first transducer is alternately connected to the first and the second inputs while the second transducer is alternately connected to the second and first inputs.

2. A fluid velocity measuring system including: at least first and second opposed acoustic transducers; generator means cyclically applying short trains of recurrent high-frequency electric pulses to the respective transducers to cause each of the said transducers to propagate short acoustic signals through the fluid under measurement toward the opposed transducer which upon receipt of the acoustic signals provides respective first and second echo pulses; phase-shift measuring means for measuring the phase-shift between said first and second echo pulses, said phase-shift measuring means comprising an analog adder unit having first and second inputs; means connecting the said transducers to said inputs, said connecting means including switching means connected to the said transducers and phase-shifting means connecting the said switching means to the said inputs, said phase-shifting means providing a predetermined phase-shift between the first and second echo pulses and control means for cyclically controlling the said switching means, whereby the first transducer is alternately connected to the first and second inputs while the second transducer is alternately connected to the second and first inputs of said analog adder unit.

3. A fluid velocity measuring system as claimed in claim 2, wherein said analog adder unit has an output, said system further comprising circuit means connected to said output, said circuit means including detecting means for detecting the peak amplitude of the signals provided at the said output, and keeping the said peak amplitude in memory during each of the operating cycles of the switching means, thus providing a square wave voltage; means for demodulating the said square wave voltage to provide an indication of the flow velocity and feedback means for stabilizing the average value of the said square wave voltage.

4. A fluid velocity measuring system as claimed in claim 3, wherein said feedback means include an amplifier connected to the said output, said amplifier having a gain control input and an output, the detecting means being connected at the output of said amplifier and having an output, and filter means adapted for translating the said average value and connecting the output of the detecting means to the said gain control input.

5. A fluid velocity measuring system as claimed in claim 3, wherein the said analog adder unit is a potentiometer having a slide contact which forms the said output of the analog adder unit, further circuit means connecting the said generator means to the said transducers, said further circuit means being arranged for substantially providing a phase opposition between the short trains of electric pulses applied to the respective first and second transducers, the demodulating means being arranged for producing a voltage proportional to the peak-to-peak amplitude of the said square wave voltage.

6. A fluid velocity measuring system as claimed in claim 5, further comprising means for short-circuiting the said phase-shifting means.

7. A fluid velocity measuring system as claimed in claim 3, wherein said demodulating means includes a synchronous demodulator having a reference phase input, said control means being arranged for generating a periodic signal at the frequency of recurrence of said trains, said periodic signal being applied to the said reference phase input.

8. A fluid velocity measuring system as claimed in claim 3, said system comprising at least third and fourth opposed acoustic transducers respectively connected to said first and second transducers, the distance between said third and fourth transducers being substantially different from the distance between the first and second transducers, at least a further circuit means including detecting and demodulating means, and means connecting the output of the analog adder to the said circuit means and the said further circuit means for separating the signals at the said output which are respectively provided by the first and second and by the third and fourth transducers.

* * * * *